United States Patent Office 3,084,147
Patented Apr. 2, 1963

3,084,147
THERMAL POLYMERIZATION OF DICYCLO-
PENTADIENE
Louis P. Wilks, Chicago, Ill., assignor to Velsicol Chemical Corporation, Chicago, Ill., a corporation of Illinois
No Drawing. Filed June 27, 1958, Ser. No. 744,905
18 Claims. (Cl. 260—93.1)

This invention relates to the preparation of new cyclopentadiene polymers. In particular, this invention relates to new, valuable thermal polymers of cyclopentadiene and methylcyclopentadiene.

It has been known to the art for a considerable period of time that cyclopentadiene readily dimerizes, and that stocks, such as crude solvent naptha containing dicyclopentadiene and other polymerizable materials, may be readily polymerized by the use of catalysts and under limited conditions, thermally, without the use of catalyst, to produce copolymers of their monomer constituents or mixtures of polymers.

These polymers, since the polymerization is carried out at temperatures no higher than 500° F. in order to prevent extreme darkening of the resinous product, necessarily have relatively low melting points and therefore only limited utility. Further, due to their heterogeneous makeup, they are difficult to reproduce and great caution must be taken in their production lest different types of copolymers with radically different properties be formed.

The difficulty in producing such a resin with light color even with a low melting point is due in part to the presence of such constituents as indene and coumarone which tend to give the undesirably colored resins. Further, the presence of varied polymerizable materials hinders the production of a resin with uniform properties. Yet despite the foregoing it is highly desirable to have available high melting resins which are soluble in aromatic hydrocarbons, light in color and inexpensive to prepare with reproducible uniform properties.

It is therefore an object of the present invention to prepare high melting resins of light color and high solubility in aromatic compounds.

Another object of the present invention is the preparation of resinous material characterized by its uniform properties.

Another object of the present invention is the preparation of resinous material compatible with polymers such as polyvinylchloride, polyethylene and polystyrene.

Another object of the present invention is the preparation of a resin capable of bodying oil varnishes and improving the properties of the varnishes.

Another object of the present invention is the preparation of cyclopentadiene polymers containing conjugated unsaturation.

Other objects of the present invention will become apparent from the ensuing description.

Unexpectedly it has been determined that by the thermal polymerization of high purity cyclopentadiene, methyl cyclopentadiene, their dimers and codimers and mixtures thereof, i.e., dienes selected from the group consisting of cyclopentadiene, methyl cyclopentadiene, dicyclopentadiene, methyl dicyclopentadiene and dimethyl dicyclopentadiene, at controlled high temperatures in the absence of catalyst, new, novel resinous matter is produced. The present process results in a high yield of valuable product with properties controllable by means of close regulation of the temperature of polymerization.

Since cyclopentadiene and its dimer, dicyclopentadiene, are more readily available than methyl cyclopentadiene and its dimer or than codimers of said homologs, the following description of the present invention refers specifically to cyclopentadiene and dicyclopentadiene, but it is to be understood that methylcyclopentadiene and its dimer and the codimer of methylcyclopentadiene and cyclopentadiene are equivalent thereto. Further, since commercially available hydrocarbon fractions containing cyclopentadiene often contain methyl cyclopentadiene, such fractions are highly desirable feed materials provided that they contain, in accordance with the present invention, a minimum amount of polymerizables other than dicyclopentadiene (cyclopentadiene) and its homologs, less than 10% by weight being operable, less than 5% being preferred, and less than 3% being highly preferred. The polymerization can be carried on at a temperature between about 450° F. and about 550° F. While temperatures between about 450° F. and about 500° F. can be used, this temperature range gives relatively poor yields, and therefore the reaction is preferably carried out between about 500° F. and 550° F. Since the polymerization temperature is of extreme importance in the establishment of the final properties of the resin product, in specific instances it is highly desirable to more rigidly control the reaction temperature. Thus, for example, it has been found that by performing the reaction between about 520° F. and about 530° F. for about 4 to about 5 hours, the product is highly compatible with polyvinyl chloride.

The necessity of strict control over the polymerization temperature must be emphasized as it deters the formation of undesirable and less valuable products in the reaction. Thus it has been determined that when the reaction temperature is too low, undesirable quantities of a Diels-Alder type material are formed. Among the disadvantages of such a material is that it is highly insoluble in aromatics. Similarly, when the polymerization temperature becomes excessively high the product will also be insoluble in aromatics, probably caused by the extremely high degree of cross-linking. Yet the present product is highly soluble in most aromatic solvents and in several cycloaliphatics, such as cyclohexanol.

The charge for the production of the new, novel resinous product of the present invention is a hydrocarbon fraction predominantly composed of cyclopentadiene or its dimer and homologs thereof. Since cyclopentadiene and its homologs readily dimerize at normal room temperatures to dicyclopentadiene and its homologs, it is a preferred procedure to utilize dicyclopentadiene as the basic feed material, although a cyclopentadiene feed is equally operable in producing the present product. Since the present product is essentially a polymer of cyclopentadiene, dicyclopentadiene and their homologs, the charge must necessarily contain a minimum of other polymerizable material, a maximum of 10% by weight of the contained cyclopentadiene and its homologs being operable, 5% being preferred, and 3% being highly desirable. It can be seen that cyclopentadiene and dicyclopentadiene are equivalent as starting material for the production of the present product.

The charge is thus a hydrocarbon fraction preferably containing a minimum of 85% dicyclopentadiene (or cyclopentadiene). As is general in the preparation of resinous materials, it is desirable if not commercially necessary to perform the polymerization in the presence of an inert solvent so as to allow for control of the reaction and for ease of removal of the product from the reactor. Thus in the present process it is desirable to perform the polymerization in the presence of from about 40% to about 60% by weight of the high purity dicyclopentadiene charge of a non-polymerizable aromatic solvent, inert to said feed, such as xylene, toluene or benzene. It is to be understood that large proportions of solvent can be used but that they will tend to lengthen the reaction time and thus not be advantageous. So, too, is it evident that the high purity dicyclopentadiene feed can contain less than 85% actual dicyclopentadiene (or cyclopentadiene), provided that the amount of polymerizables present therein is less than 10% by weight of the actual dicyclopentadiene present and preferably less than 3% by weight of the dicyclopentadiene, in which case proportionately less solvent need be added to provide the desired reaction mixture. Consequently the preferred reaction mixture initially contains from about 30% to about 60% dicyclopentadiene, up to about 3% by weight other polymerizables and inert, non-polymerizable solvent. The critical portion of the reaction mixture is the minimum quantity of polymerizables other than dicyclopentadiene (or cyclopentadiene).

While it is preferred to have a feed containing a minimum of about 30% dicyclopentadiene, feeds containing less dicyclopentadiene (or cyclopentadiene) are operable provided that they contain less than about 10% by weight of the dicyclopentadiene initially present or other polymerizables in the feed, although such dilute reaction mixtures necessitate relatively long reaction times and additional equipment which commercially is not practical. Nevertheless, feeds containing as low as 20% by weight of dicyclopentadiene are operable, and lower concentrates can be used. Similarly, while feeds containing a maximum of about 60% by weight of dicyclopentadiene (or cyclopentadiene) are preferred due to the necessity of performing the polymerization within the specified temperature range and also to facilitate the removal of the product from the reactor, feeds containing up to about 80% by weight of dicyclopentadiene are operable, and higher concentration feeds are usable.

While the reaction time of the present process is not as critical as the temperature, it has been determined that reaction times between about 1 and about 15 hours produce substantial yields of high-grade resin, it being preferred to keep the reaction time within 2 to 5 hours. The reaction time must, of course, be increased as the reaction temperature is decreased within the previously defined limits in order to obtain similar yields.

As will be noted from the ensuing examples, high yields of the new, novel resinous product of the present invention are readily available. That is, resin yields of 90% or better based on the dicyclopentadiene (or cyclopentadiene) available in the feed are readily obtained.

Since the reaction is performed in the liquid phase at temperatures above the vaporization point of the solution, it is necessary to use sufficient pressure during the reaction so as to maintain a liquid reaction mixture. In the specified temperature range and using the preferred solvents this pressure will usually be between about 200 and 300 pounds per square inch.

As previously indicated, while it is preferred to have high purity dicyclopentadiene as the polymerizable, it is possible although not preferred to use a high concentrate cyclopentadiene feed in place of the dicyclopentadiene feed.

The apparatus necessary for the performance of the present process is comparable to that used in the art for the preparation of thermal polymers, the necessary equipment depending somewhat on whether the process is to be performed as a batch or a continuous process. Basically what is needed is a jacketed reactor, preferably baffled to insure uniform heating of the reaction mixture, and equipped with suitable means for heating the reaction mixture, such as a hot oil system. This reactor must be able to withstand substantial pressure, i.e., about 500 pounds per square inch, since the reaction is performed in the liquid phase at temperatures above the boiling point of the reaction mixture.

Other equipment used in the process is pumps or other suitable means for charging the reactor with the dicyclopentadiene and solvent; meters or other suitable means for accurately determining the quantity of dicyclopentadiene and solvent added to the reactor; preheaters which can be used if desired for preheating the solvent and dicyclopentadiene reactant; temperature and pressure controllers, recorders and indicators which allow for accurate control of the reaction; heat exchangers for controlled cooling of the product; vacuum distillation equipment for removing the solvent and unpolymerized material from the final resinous product; and customary storage and miscellaneous equipment used in the industry.

In the preferred operation, the high purity dicyclopentadiene and the aromatic solvent, preferably xylene, toluene or benzene, are pumped by means of a metering pump through a heat exchanger which raises the temperature of the mixture to between about 350° and 400° F. As previously indicated, in order to obtain high yields of good product in a reasonable reaction time and to be able to maintain it as a solution the concentration of dicyclopentadiene (or cyclopentadiene) in the charge to the reactor is preferably maintained between about 30% and 60% by weight. If desired, the heat exchanger need not be used, the reaction mixture being heated to the proper temperature entirely in the reactor. However, due to the relatively small surface area of the reactor, the relatively large volume of reactant, fast rate of reaction and the formation of color bodies on overheating, the latter alternative requires a relatively slow initial heating of the charge. Instead of measuring the charge by means of a metering pump, it can be measured by use of a scale or other like mechanical methods. However, the use of a metering pump is preferred, particularly in a continuous process.

The method of heating the reactor can be by means known to the art, such as high pressure steam or a hot oil system equipped with controllers such that the temperature of the reaction mixture can be maintained in the herebefore indicated range of reaction temperature. It is highly desirable that the reactor be baffled to insure complete and uniform polymerization of the reaction mixture, the baffles preventing a portion of the feed from passing through the reactor in less than the desired time and part thereof from having too long a reaction time. A pressure controller enables the operator to keep the system under the pressure necessary to have a substantially liquid phase reaction at the polymerization temperatures.

If the polymerization is performed as a continuous process, the product is removed at a rate equivalent to the feed rate, the exact rate being dependent on the size of the reactor and specific reaction time. The product which is in the form of a resinous solution is preferably fed to a vacuum distillation column wherein the solvent is removed preferably by heating at a temperature no higher than the polymerization temperature so as to prevent further polymerization of the reaction mixture. This is readily accomplished by removing the solvent from the reaction mixture under reduced pressures, the exact pressure being dependent on the maximum temperature used, namely, the maximum polymerization temperature, and the boiling point of the solvent. In the alternative the resin solution can be stored in the condition it occurs at the completion of the reaction and the solvent removed subsequently at the convenience of the operator. Once the solvent has been removed from the reaction mixture, the product is cooled to room temperature by known means for the cooling of resinous products. In the cooling it is desirable to uniformly cool the product at a constant rate by the use of shallow pans, flakers, and the like.

While the above description indicates the preferred continuous method of performing the present invention, the polymerization can likewise be run as a batch process. Thus an autoclave or other reactor capable of holding the pressure necessary to maintain a liquid reaction mixture without loss of solvent, namely, from about 200 to 300 pounds per square inch, can be used. A batch operation is generally not preferred due to the economics and the added problems of controlling the reaction.

The following examples demonstrate the preparation of these new, valuable resins but are not to be construed as imposing over-all limitations on the present invention as they are merely exemplary of the present process and product thereof.

*Example 1*

This example was performed using a continuous system similar to that previously described, the reactor having a capacity of 5.7 gallons. The feed was composed of 50% by weight of xylene and 50% by weight of a fraction containing 92% by weight dicyclopentadiene and about 4% by weight of other polymerizables. This feed was fed into the reactor at a rate of 1.3 gallons per hour and heated therein to a temperature between 520–530° F. at 300 pounds per square inch pressure for 4½ hours, passing uniformly through the reactor for said time period. The product solution was then reduced under 30 mm. Hg and at a maximum temperature of 500° F. to remove the solvent. The product resin had a melting point of 300–330° F. and a Gardner color of 10+. The yield of product based on the dicyclopentadiene charged was 94%, 346 pounds of product.

*Example 2*

The same equipment and feed composite was used as in the first example. However, the feed rate was increased to about 1.9 gallons per hour, the hold time in the reactor decreased to about 3 hours, and the reaction temperature increased to 530–550° F. 105 pounds of product representing a 90% yield of the available dicyclopentadiene, having a melting point of 300–330° F. and a Gardner color of 11–12, was recovered after the reduction under 30 mm. Hg at 500° F.

*Example 3*

A third preparation of the valuable polymerized dicyclopentadiene resin was performed on a batch scale using a 500 ml. steel bomb equipped to withstand high pressure. The bomb was charged with a feed composed of 45% by weight of xylene and 55% by weight of a fraction containing 92% by weight of dicyclopentadiene and about 2% by weight other polymerizables. This mixture was maintained at 500° F. for 4 hours, then placed in a still and reduced under 30 mm. Hg at a maximum temperature of 490° F. The resin product thereof represented a 90.2 yield based on dicyclopentadiene charge, had a Gardner color of 9–10 and a melting point of between about 325° F. and 340° F.

From the foregoing examples the superior properties of this resin are readily ascertainable. In general, resins with melting points from 250° F. to 400° F. and higher can be obtained. By proper control of the reaction temperature, reduction conditions and cooling rate a melting point of quite narrow range can be obtained. The reduction (removal of the solvent) should be performed at as low a temperature as is possible to remove all of the solvent and in a relatively short time period to minimize additional polymerization.

Thus by prolonged heating or by raising the polymerization temperature to about 600° C. or higher the thermoplastic resinous product can be converted into a thermoset product with high resilience and impact strength. Likewise, the product should be rapidly and uniformly cooled by heat exchangers with adequate surface area so that all of the product cools at approximately the same rate. The latter accounts for much of the range in melting point in the examples wherein the products were cooled overnight in large diameter drums so that the innermost product retained its heat for much longer time than that in the periphery. However, processing well known to the art, such as flaking, removes this problem, and in general the proper cooling of such products is well known to the art and such procedures are well adapted to the present invention.

This new polymerized dicyclopentadiene product has properties of extreme benefit in a variety of uses. Its color is quite light, being between a Gardner color of about 9 and 13, thus permitting its use in a variety of applications such as paints, varnishes, lacquers, polyvinyl chloride extenders, polyethylene extenders, polystyrene and other like extenders, tile applications, rubber applications, particularly items like white wall tires and other light colored products. In addition to its color, the present product has many superb characteristics, including a high melting point which promotes the formation of a tough, hard film when incorporated into a surface coating, a property of paramount importance in the use of the product as an extender and of value in many other applications.

A significant characteristic of the new, novel resin of the present invention is that it contains a system of conjugated double bonds. While the resin apparently contains unsaturation in addition to the conjugation, the presence of the latter contributes beneficial properties to the product. The presence of the conjugated double bonds was determined by first determining that the resinous product could be characterized as strongly absorbing ultraviolet rays at a wave length of 260 m$\mu$ (millimicrons). This strong absorption band is characteristic of a conjugated cyclohexadiene configuration.

The presence of the conjugated system was substantiated by reacting the resinous product with an extreme excess of maleic anhydride (equal parts by weight) under relatively mild conditions, i.e. 80° C. for thirty minutes in a solution of cyclohexane. An ultraviolet examination of the reaction product found that the aforementioned strong absorption band at 260 m$\mu$ had been greatly diminished in its intensity. Still further substantiation of the conjugation was obtained by catalytically hydrogenating the present product which resulted in a similar reduction in this ultraviolet absorption band. Thus the presence of the conjugation is relatively certain and is unquestionably a prominent cause of the beneficial properties of this product as herein described, such as its excellent varnish-bodying properties.

While the molecular weight, as determined by the cryoscopic method using benzene as the solvent, will vary with the polymerization temperature, time, exact content of the feed stock, and the conditions used to remove the solvent from the resinous product, the present product does have a relatively low molecular weight, being between about 500 and 2,500. By using careful control on the polymerization and subsequent recovery of the product, a resin with a molecular weight between about 800 and 1,900 is obtainable, and if desired the molecular weight can be kept between about 800 and 1,000. Further, the present product has been titrated with perbenzoic acid to determine the degree of unsaturation. It has thus been found that the present product contains from about 0.3 to about 0.5 double bonds per mol of cyclopentadiene contained therein and that by strict control of the reaction conditions, the number of double bonds per mol of cyclopentadiene can be maintained between about 0.3 to 0.4. Another valuable property of the present product is that it is thermal plastic, possessing all of the beneficial properties of a thermal plastic resin and yet by continued heating can be converted to a thermally set product. Thus this valuable new resin has the advantage of having the beneficial properties of thermal plastic and thermal set resins.

In addition, the present product has high alkali resistance enhancing its value in protective coatings in areas exposed to chemicals, certain gases, and the like, such as found in chemical processing and laboratory equipment. It is highly soluble in most aromatic solvents, including benzene, toluene and xylene and in several cycloaliphatic solvents, such as cyclohexanol. Likewise, it is compatible with many other resins and is drying oil reactive.

Its iodine number varies from about 210 to about 240 by Wijs' method.

The new resin product has valuable utility in protective coatings (paints, varnishes, lacquers, waxes), the formation of molded articles, adhesives, fabric-impregnating materials, inks, polishes, dyes, tile, rubber products, and the like.

It can be used to extend epoxy resins to improve their detergency resistance and to extend various water emulsion paints.

In particular, the use of the resin of the present invention in combination with polymers such as polyvinyl chloride, polystyrene and polyethylene provides a valuable, highly desirable composition with a multiplicity of utility. In view of the relatively low unit cost of the present product, especially in comparison with high-priced polymers such as polyvinyl chloride, the incorporation of the former into the latter in reasonable quantities produces a product with comparable physical and improved electrical properties. It has been determined that up to about 35% by weight of the present product can be incorporated into polyvinyl chloride without impairment of the latter's tensile strength, per cent elongation, electrical capacitance and resistivity. In specific formulations these latter properties are in fact improved by specific quantities of the present product, a thoroughly unexpected but desirable attribute. This type of composition finds utility as wire and cable coatings due to its superb electrical and mechanical properties.

In general, the polyvinylchloride-present product combinations can be prepared by standard procedures for the preparation of polyvinyl chloride formulations, such as dry blending. As in most applications of polyvinyl chloride it is usually required to add stabilizers, plasticizers and other additives, and the present resin can be incorporated therein as another additive. However, one modification in the preferred dry blending method which in essence comprises preheating the polyvinyl chloride to about 150° F. spraying preheated plasticizer thereon, heating to about 200° F. to dry the blend, followed by addition of stabilizers, fillers, and pigments, and cooling the mixture in the blender (a heated ribbon blender, dough type blender or muller will suffice), said modification being the cooling of the mixture after heating it to about 200° F. at which time the present product is added thereto and blended therein.

In accordance with this use, the resultant formulations will contain stabilizers, plasticizers and other normal additives, with the present product being substituted for a portion of the polyvinyl chloride. Thus for example the following formulations were prepared:

*Example 4*

|  | Grams |
|---|---|
| Polyvinyl chloride | 90 |
| HB-40 | 14.9 |
| Product of Example 1 | 9.0 |
| Dioctyl phthalate | 7.6 |
| Dyphos | 2.7 |
| Tribase | 9.0 |
| Paraffin | 0.5 |
| Calcium stearate | 0.9 |

HB-40 is a clear, mobile, high boiling hydrocarbon distilling between 345–420° C. Dyphos is the dibasic lead salt of phosphorous acid. Tribase is hydrous tribase lead sulfate.

This formulation was prepared by milling the various components together in a ball mill. The blend was then compression molded at a temperature of 355° F. and 5,000 pounds per square inch pressure and the molded article by actual test had a tensile strength of 1,944 pounds per square inch.

A standard was prepared in which the above formulation was employed except for the replacement therefrom of the present product by an equal weight of polyvinyl chloride, and the molded article was found to have a tensile strength of 1,416 pounds per square inch. Thus the formulation containing the present product had improved tensile strength.

*Example 5*

|  | A, parts | B, parts | C, parts |
|---|---|---|---|
| Polyvinyl chloride | 1,000 | 800 | 750 |
| Product of Example 1 |  | 200 | 250 |
| Atomite | 130 | 130 | 130 |
| Tribase | 51 | 51 | 51 |
| Dioctylphthalate | 253 | 253 | 253 |
| HB-40 | 131 | 131 | 131 |
| Santicizer 140 | 126 | 126 | 126 |

Atomite is a mechanically ground calcium carbonate. Santicizer 140 is a monocresyl diphenyl phosphate.

These formulations were prepared by the method previously outlined and extruded onto wire. It is evident that the sole difference between formulations A, B, and C is the quantity of the present product included therein. These formulations were then tested for electrical resistance with the following results being obtained:

[Resistance (megohms/ft.)]

| A | B | C |
|---|---|---|
| 34 | 294 | 504 |

This data shows how unexpectedly the present product can be substituted for the more expensive polyvinyl chloride and produce a composition having superior properties thereto.

Still other uses and applications for the present product are available, particularly utility in the preparation of varnishes.

The unusual properties of the present resin are exemplified by its use in varnishes, particularly oleo-resinous varnishes, in which use the present products impart unusually good alkali resistance and hardness while at the same instance improving the drying time. In order to determine the properties of a varnish a homopolymerized dicyclopentadiene resin comparable to that of Example 2 was heated with various oils, namely, tung oil, dehydrated castor oil and unbodied linseed oil to determine the bodying rate. Control tests were performed using a commonly used phenolic resin, Amberol F–7 light, which is a rosin or gum modified phenolic resin manufactured by Rohm and Haas, and Bakelite BR–254 which is an alkyl phenolic formaldehyde resin of the Bakelite Division of Union Carbide and Carbon Chemicals Corporation.

The procedure employed in these tests was varied slightly, depending on the oil and the resin. With the phenolic resins all of the resin and oil were charged to a 3-necked glass reaction flask equipped with an inlet tube for the introduction of an inert gas and heated to the desired temperature. It was maintained at this temperature until the bodying had proceeded to the proper point, a Gardner viscosity of between D and H, at which time the mixture was diluted with an equal quantity of xylene. A minor modification was utilized in the case of the homopolymerized dicyclopentadiene resin in that initially only one-half of the oil was charged, the remainder being added at the time when a droplet of the reaction mixture removed therefrom gave a clear pill.

The tung oil mixes were heated to and maintained at a temperature of 450° F. due to their high reactivity, whereas a temperature of 550° F. was employed for the castor and linseed oil varnish preparations. Two different proportions of oil and resin were used: (*a*) a 12½ gallon oil length (hereinafter designated 12½) which used equivalent weight of oil and resin, (*b*) a 25 gallon oil length (hereinafter designated 25) using two parts of oil for each part of resin. In each run the time necessary to achieve a Gardner viscosity of D–H for the 50% solution was determined to be as follows, the numbers being the time in hours necessary to achieve the desired viscosity:

|  | Tung Oil | | Dehydrated Castor Oil | | Unbodied Linseed Oil | |
| --- | --- | --- | --- | --- | --- | --- |
|  | 12½ | 25 | 12½ | 25 | 12½ | 25 |
| Product of Example 2 | 2.1 | 1.5 | 3.6 | 4.0 | 2.3 | 4.3 |
| Amberol F-7 light | 1.3 | 1.2 | 4.5 | 5.4 | 8.2 | 7.1 |
| Bakelite BR-254 | 0.3 | 0.7 | (¹) | (¹) | (¹) | (¹) |

¹ No test performed.

As is readily observed from the foregoing table, the drying times of the castor and linseed oil varnishes with the present product as the resinous components have considerably shortened drying times, particularly in the case of the unbodied linseed oil. While the drying times of the present product—tung oil varnish—are somewhat longer than the conventional phenolic, peculiarly enough this too is often advantageous since the tung oil varnishes react so quickly that they are difficult to handle. Consequently a reasonable increase in this abbreviated reaction time can be of immeasurable importance in the control of the reaction. Thus it is desirable to have a short drying time but not have the reaction proceed out of control. This is possible with varnishes containing the resin of the present invention.

In addition to their desirable drying times, these varnishes prepared from the product of the present invention have other preferred properties, especially improved hardness and alkali resistance. Thus, using as a test solution, a 3% by weight solution of sodium hydroxide, tests performed on the tung oil-Amberol F-7 and tung oil-product of Example 2 varnishes (25) applied as films found the former failing after twelve hours' exposure, while the latter was intact, although slightly cloudy, after 136 hours' exposure. Consequently varnishes utilizing the present resin have improved chemical resistance.

Further, the hardness of the above varnishes as films was determined by applying the varnish and taking a hardness reading one month later. A hardness scale with plate glass having a reading of 100 was used. The hardness readings are as follows:

|  | Tung Oil | | Dehydrated Castor Oil | | Unbodied Linseed Oil | |
| --- | --- | --- | --- | --- | --- | --- |
|  | 12½ | 25 | 12½ | 25 | 12½ | 25 |
| Product of Example 2 | 58 | 52 | 62 | 52 | 58 | 56 |
| Amberol F-7 | 52 | 40 | 40 | 22 | 42 | 28 |
| Bakelite BR-254 | 44 | 41 |  |  |  |  |

It is readily apparent that the varnish films prepared from the product of the present invention are considerably harder than those of the conventional phenolic based varnishes. This is a highly desirable property of a varnish which enhances its utility and extends the overall value of the material. That the present product should render such valuable characteristics to a varnish prepared therefrom is quite unexpected, exemplifying the unusual properties of the present product.

Thus the new, novel product of the present invention is of multifold utility due to its desirable physical and chemical properties.

I claim as my invention:

1. A process for the preparation of resinous material which comprises subjecting a reaction mixture containing as its polymerizable components, a diene selected from the group, consisting of cyclopentadiene, methylcyclopentadiene, dicyclopentadiene, methyldicyclopentadiene, dimethylcyclopentadiene and mixtures thereof and the balance non-polymerizable solvent therefor, to thermal polymerization at a temperature between about 500° F. and 550° F. while maintaining the reactants in a substantially liquid condition.

2. A process for the preparation of resinous material which comprises the thermal polymerization by heating a reaction mixture containing from about 20 to 80% by weight, polymerizable components selected from the group consisting of cyclopentadiene, methylcyclopentadiene, dicyclopentadiene, methyldicyclopentadiene, dimethylcyclopentadiene, and mixtures thereof and the balance non-polymerizable solvent therefor, in the liquid phase at a temperature between about 500° F. and about 550° F. for from about 1 to about 15 hours.

3. A process for the preparation of polymeric material, which comprises subjecting in the liquid phase a reaction mixture containing from about 30 to about 60% by weight polymerizable components selected from the group consisting of cyclopentadiene, methylcyclopentadiene, dicyclopentadiene, methyldicyclopentadiene, dimethylcyclopentadiene and mixtures thereof, and the balance non-polymerizable solvent therefor to thermal polymerization, at a temperature between about 500° F. and 550° F. for from about 1 to about 15 hours.

4. A process for the preparation of resinous material which comprises subjecting in the liquid phase a reaction mixture containing from about 30 to about 60% by weight dicyclopentadiene and the balance non-polymerizable solvent therefor to thermal polymerization, at a temperature between about 520 and 530° F. for from about 2 to about 5 hours.

5. A process for the preparation of resinous material which comprises the thermal polymerization by heating and maintaining a liquid reaction mixture containing from about 20% to about 80% polymerizable components selected from the group consisting of cyclopentadiene, methylcyclopentadiene, dicyclopentadiene, methyldicyclopentadiene, dimethyldicyclopentadiene, and mixtures thereof, and the balance non-polymerizable solvent at a temperature about 500° F. and 550° F. for from about 2 to 5 hours at a pressure between about 200 and 300 pounds per square inch.

6. A process for the preparation of resinous material which comprises the thermal polymerization by heating and maintaining a liquid reaction mixture, containing from about 30 to about 60% by weight, dimethyldicyclopentadiene and the balance non-polymerizable solvent at a temperature between about 520° F. and about 530° F. for from about 2 to about 5 hours.

7. A process for the preparation of resinous material which comprises the thermal polymerization by heating and maintaining a liquid reaction mixture containing from about 20 to about 80% by weight of dicyclopentadiene and the balance non-polymerizable solvent, at a temperature between about 500° F. and about 550° F. and recovering by distillation under subatmospheric pressure at a maximum temperature of 550° F. a resinous material having a melting point between about 250° F. and 400° F.

8. Process of claim 7 wherein the feed contains a minimum of about 72% by weight of a dicyclopentadiene.

9. Process of claim 7 wherein the solvent is benzene.

10. Process of claim 7 wherein the solvent is toluene.

11. Process of claim 7 wherein the solvent is xylene.

12. Thermally polymerized dicyclopentadiene having a melting point between about 300° F. and 330° F., a molecular weight between about 800 and 1900, soluble in toluene and containing from about 0.3 to about 0.5 double bonds per polymerized cyclopentadiene molecule.

13. A resinous material composed substantially of polymerized dicyclopentadiene soluble in toluene, containing about 0.3 to about 0.5 double bonds per polymerized cyclopentadiene molecule and having a melting point between 250° F. and 400° F.

14. A resinous material composed substantially of thermally polymerized dicyclopentadiene, soluble in toluene, containing about 0.3 to about 0.5 double bonds per polymerized cyclopentadiene molecule, and having a melting point between 300° F. and 330° F.

15. A resinous material composed substantially of thermally polymerized dicyclopentadiene having a melting point between about 300° F. and about 330° F., containing about 0.3 to about 0.5 double bonds per polymerized cyclopentadiene molecule, and a color on the Gardner scale of less than 12.

16. Thermally polymerized dicyclopentadiene having a melting point between about 250° F. and 400° F., soluble in toluene, containing about 0.3 to about 0.5 double bonds per polymerized cyclopentadiene molecule, and having a molecular weight of between about 500 and 2,500.

17. A thermal polymer of dicyclopentadiene having a melting point between about 300° F. and 330° F., containing about 0.3 to about 0.5 double bonds per polymerized cyclopentadiene molecule, and a molecular weight between about 800 and 1,900 and soluble in toluene.

18. A resinous material composed essentially of thermally polymerized dicyclopentadiene, containing conjugated unsaturation, a melting point between about 250° F. and 400° F., containing about 0.3 to about 0.5 double bonds per polymerized cyclopentadiene molecule, and soluble in toluene.

References Cited in the file of this patent

UNITED STATES PATENTS

| | | |
|---|---|---|
| 2,067,073 | Carmody | Jan. 5, 1937 |
| 2,314,903 | Soday | Mar. 30, 1943 |
| 2,314,904 | Soday | Mar. 30, 1943 |
| 2,731,370 | Tramm et al. | Jan. 17, 1956 |
| 2,734,031 | McNaughtan | Feb. 7, 1956 |
| 2,898,316 | Roelen | Aug. 4, 1959 |

FOREIGN PATENTS

| | | |
|---|---|---|
| 774,871 | Great Britain | May 15, 1957 |

UNITED STATES PATENT OFFICE
CERTIFICATE OF CORRECTION

Patent No. 3,084,147                      April 2, 1963

Louis P. Wilks

It is hereby certified that error appears in the above numbered patent requiring correction and that the said Letters Patent should read as corrected below.

Column 5, line 59, for "600° C." read -- 600° F. --; column 6, line 25, for "cyclohexadiene" read -- cyclopentadiene --; column 10, line 38, after "temperature" insert -- between --.

Signed and sealed this 22nd day of October 1963.

(SEAL)
Attest:

ERNEST W. SWIDER
Attesting Officer

EDWIN L. REYNOLDS
Acting Commissioner of Patents